R. L. GALLUP & W. G. WACHS.
BOTTLE WASHING MACHINE.
APPLICATION FILED SEPT. 19, 1914.
1,273,602.
Patented July 23, 1918.
7 SHEETS—SHEET 4.
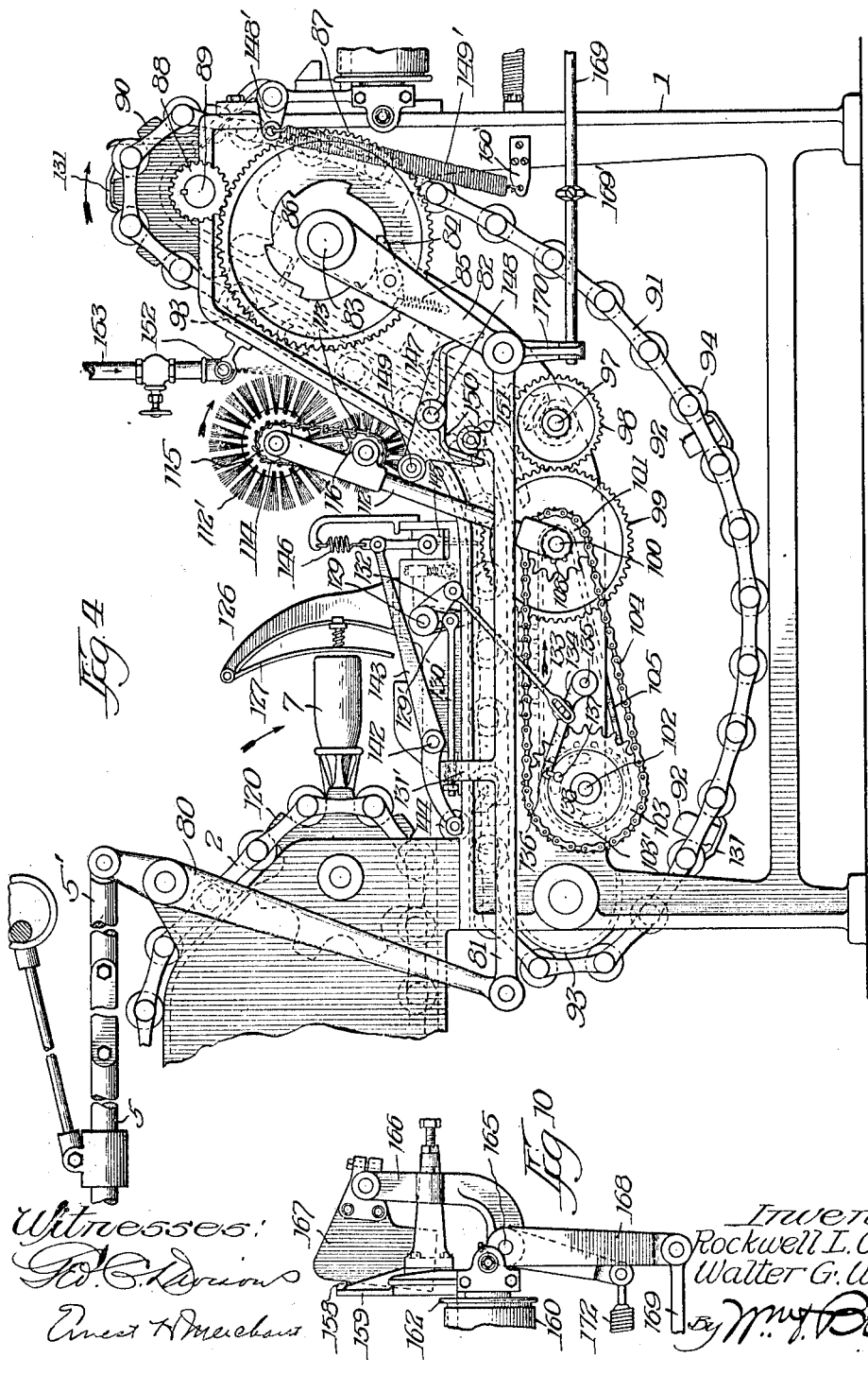

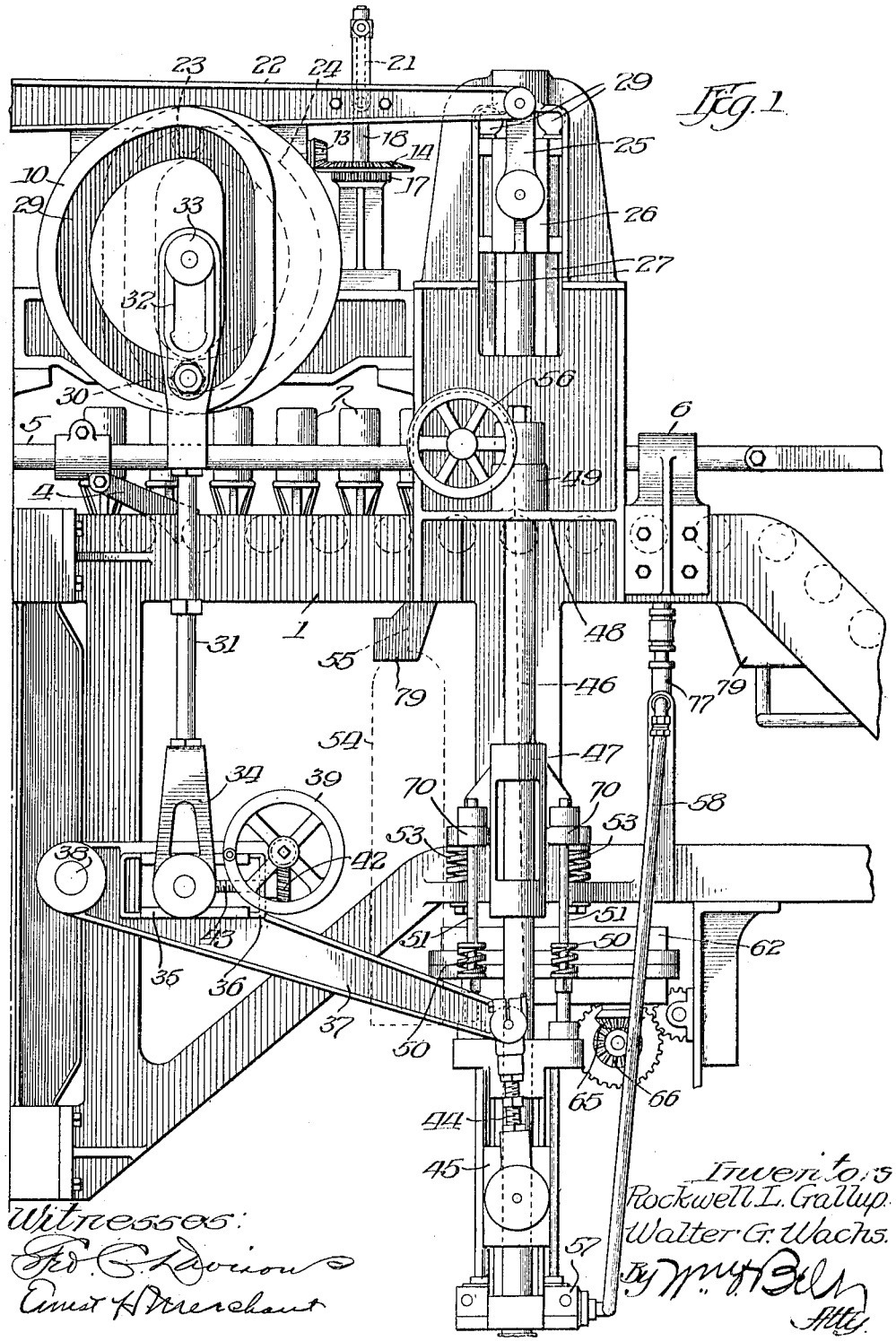

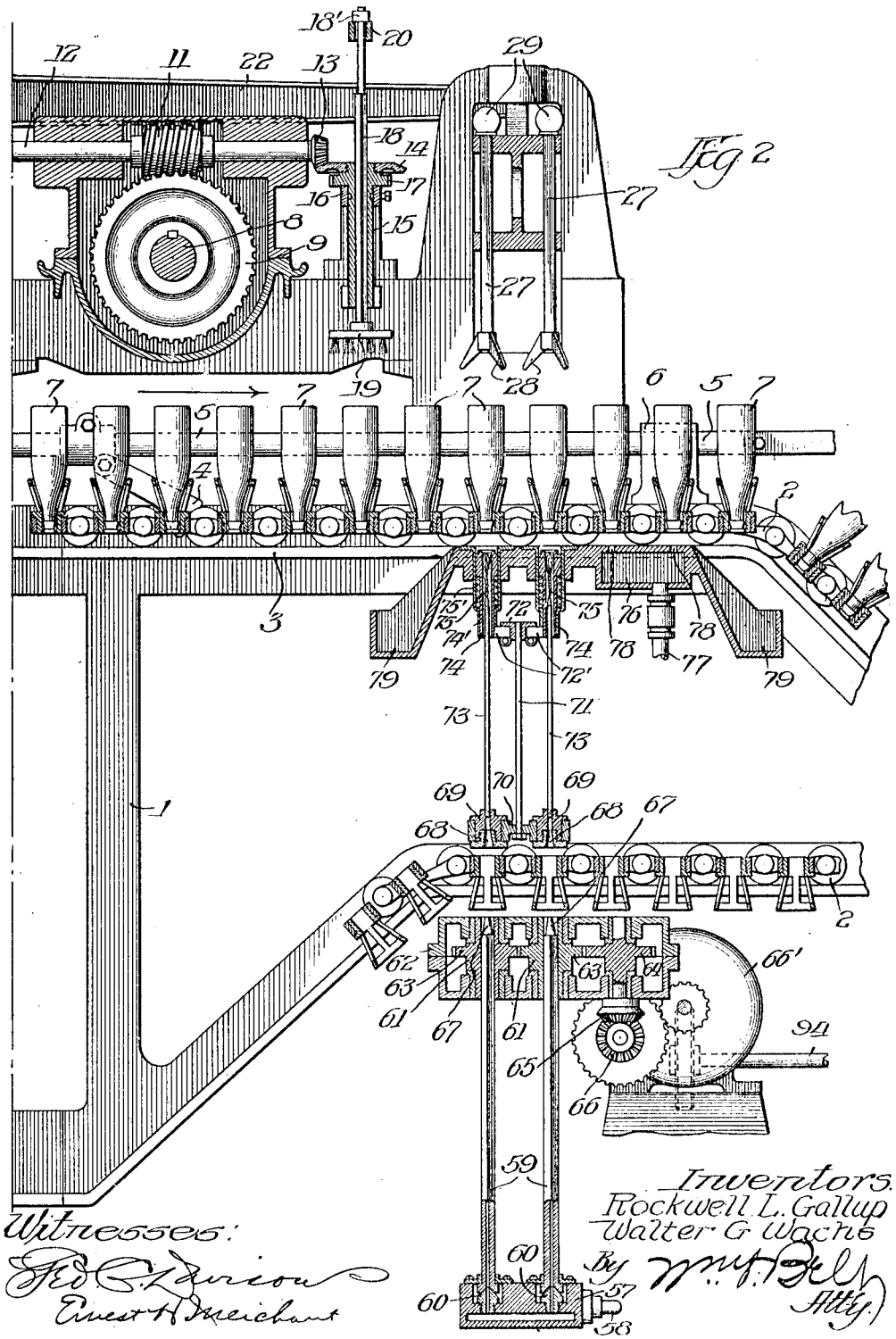

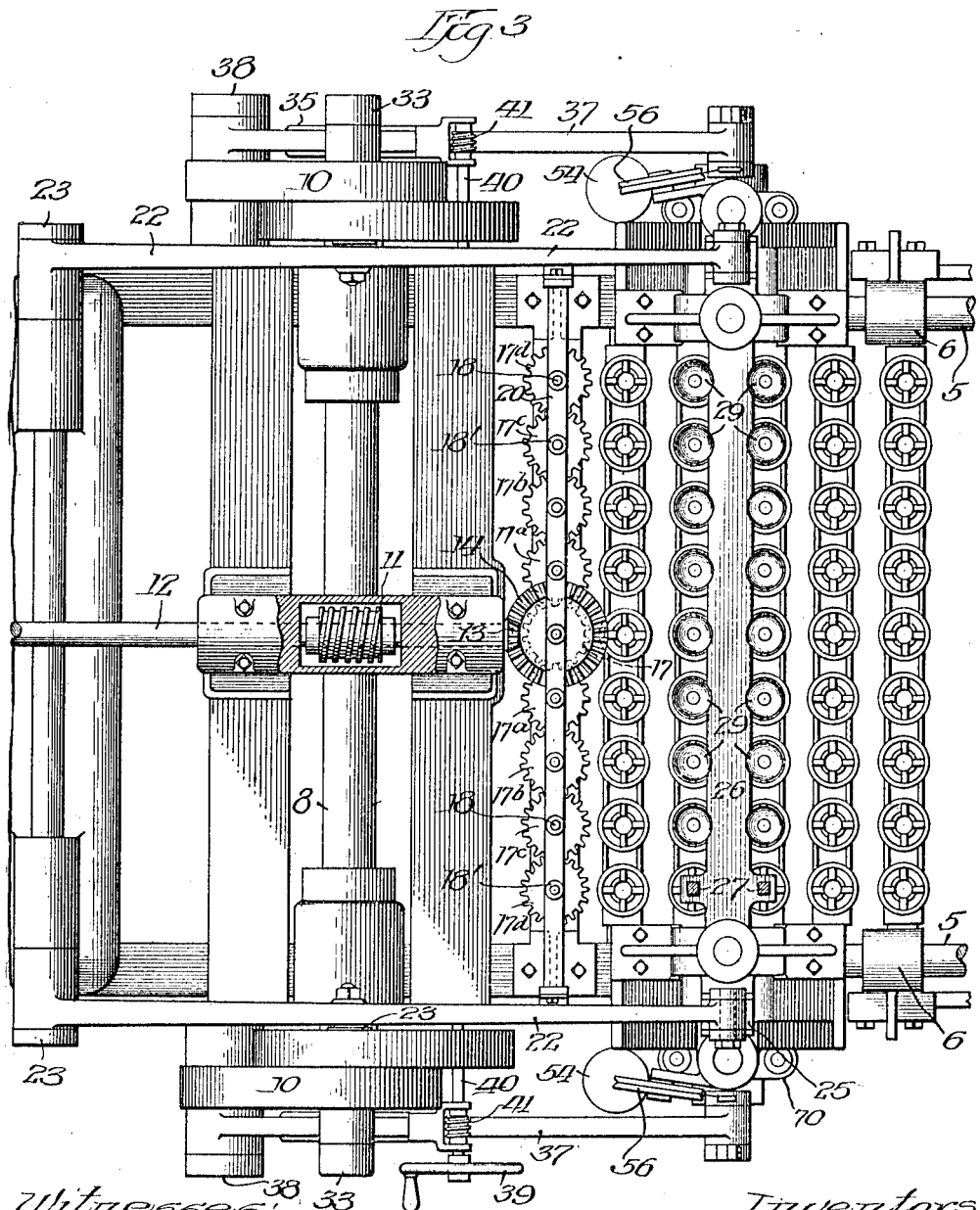

R. L. GALLUP & W. G. WACHS.
BOTTLE WASHING MACHINE.
APPLICATION FILED SEPT. 19, 1914.
1,273,602.
Patented July 23, 1918.
7 SHEETS—SHEET 5.
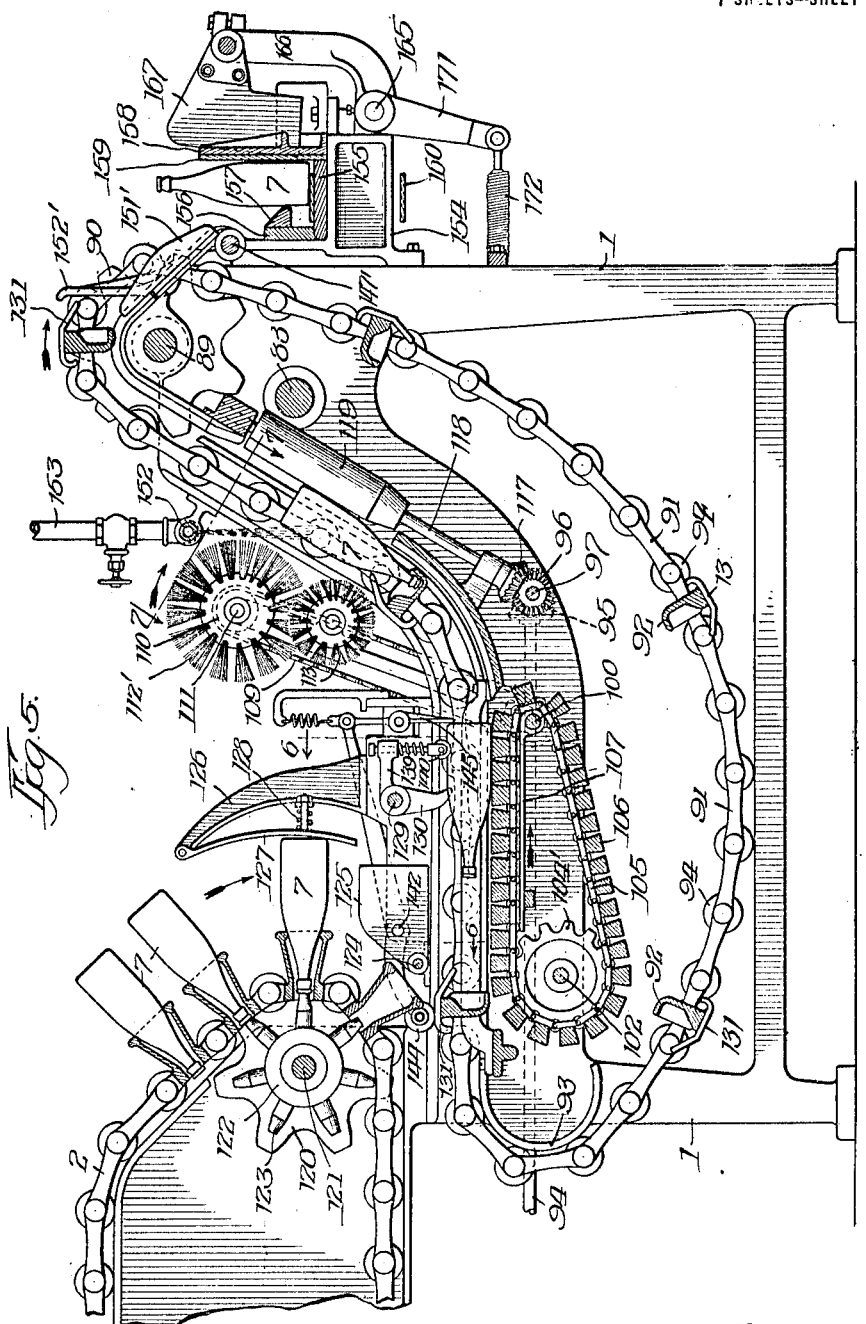
Witnesses:
Inventors
Rockwell L. Gallup
Walter G. Wachs.

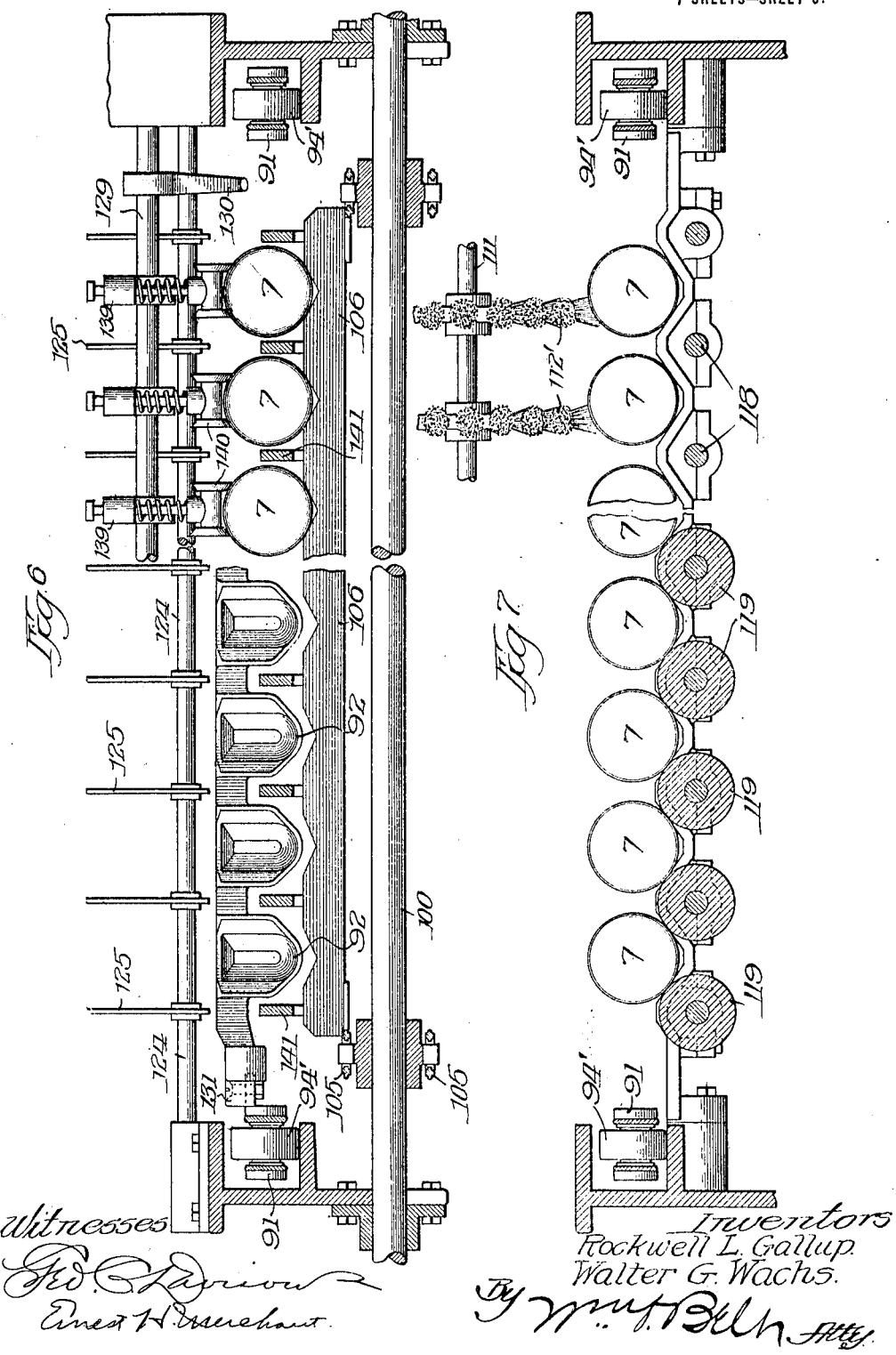

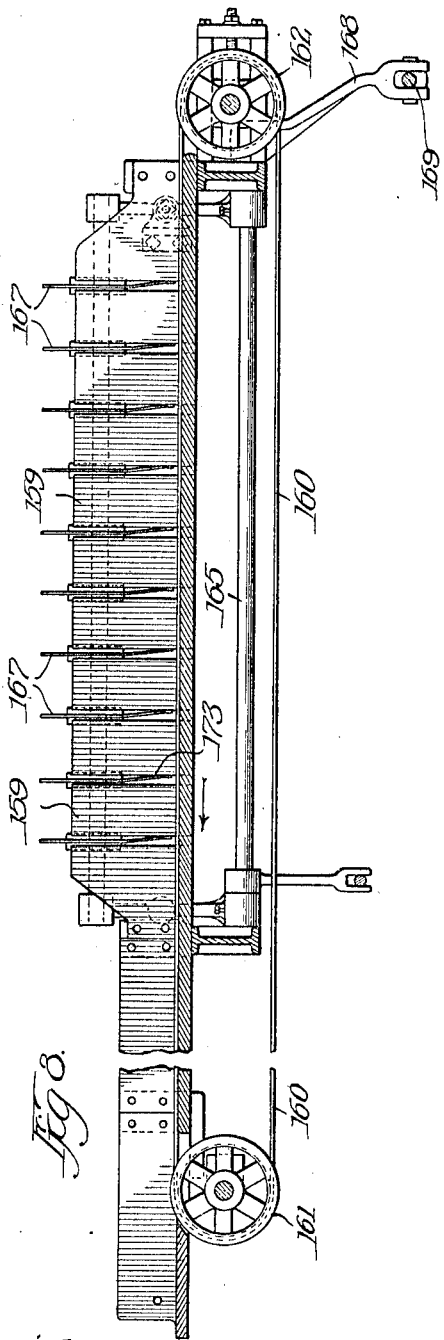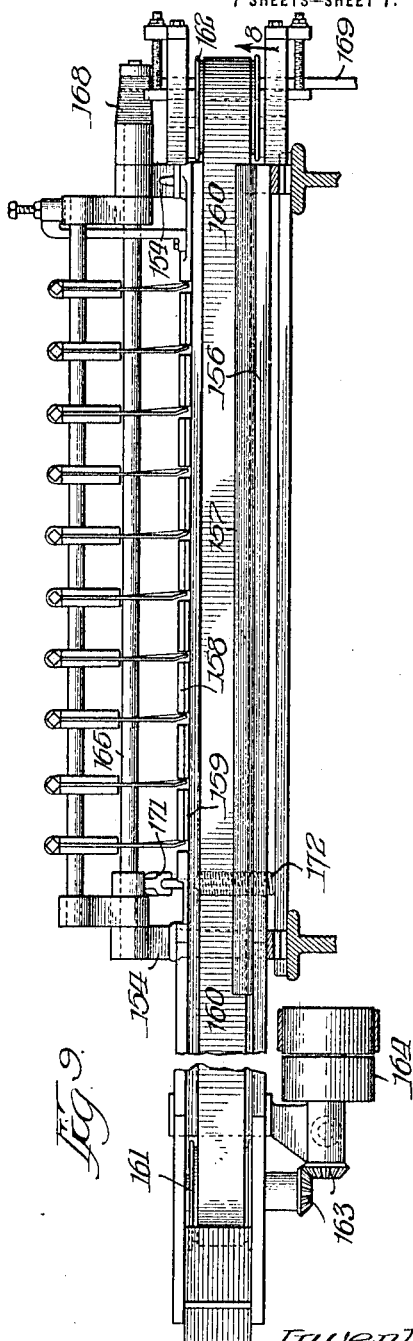

UNITED STATES PATENT OFFICE.

ROCKWELL L. GALLUP AND WALTER G. WACHS, OF CHICAGO, ILLINOIS, ASSIGNORS TO BARRY-WEHMILLER MACHINERY COMPANY, OF ST. LOUIS, MISSOURI, A CORPORATION OF MISSOURI.

BOTTLE-WASHING MACHINE.

1,273,602.     Specification of Letters Patent.     Patented July 23, 1918.

Application filed September 19, 1914. Serial No. 862,476.

*To all whom it may concern:*

Be it known that we, ROCKWELL L. GALLUP and WALTER G. WACHS, citizens of the United States, both residing at Chicago, in the county of Cook and State of Illinois, have jointly invented certain new and useful Improvements in Bottle-Washing Machines, of which the following is a specification.

Our invention relates in general to bottle washing machines and more especially to a machine for thoroughly brushing the inside and outside of the bottles and delivering them at a convenient place for subsequent use.

The apparatus disclosed in our present application is adapted to be used in connection with the bottle washing machines disclosed in the copending applications of Rockwell L. Gallup, Serial No. 647,005, filed August 31, 1911, and Serial No. 678,316, filed February 17, 1912, but is not limited to such use, as it may be used to obtain equally good results with other mechanism for soaking the bottles.

In the applications referred to are disclosed means for soaking the bottles in a caustic solution to loosen the labels thereon and for cleaning the bottles. No means is provided, however, for brushing the interior and exterior of the bottles as is sometimes desirable to improve the results obtained. Furthermore, in the devices previously disclosed the bottles must be removed from the conveyer by hand and this generally necessitates the employment of at least two men who remove the bottles and carry them to the bottling machine where they are filled.

It is the object of our present invention to provide a means for thoroughly cleaning and brushing the interior and exterior of the bottles, removing whatever dirt may remain on the bottles after the soaking operation and leaving the bottles as clean as when new.

A further object of our invention is the provision of means for automatically removing the bottles from the machine and conveying them to some desirable point, preferably the bottling machine which may be so arranged as to receive the bottles as fast as they are washed and fill them at once.

Other objects and advantages of our invention will be apparent as the same is better understood by reference to the following specification when read in connection with the accompanying drawings in which—

Figure 1 is a side elevation of that portion of the machine which adjoins the soaking and washing machine as disclosed in the prior applications and which is devoted to the interior and bottom brushing features of our present invention;

Fig. 2 is a vertical section through the same portion of the machine;

Fig. 3 is a plan view of this structure;

Fig. 4 is a side elevation showing on a slightly smaller scale an extension of Fig. 1 and disclosing that portion of the device which is devoted to brushing the sides of the bottles;

Fig. 5 is a vertical section through this portion of the machine showing a vertical section through the automatic means for removing the bottles from the machine;

Fig. 6 is a vertical section on the line 6—6 of Fig. 5 looking from the right;

Fig. 7 is a section on the line 7—7 of Fig. 5;

Fig. 8 is a vertical section on the line 8—8 of Fig. 9 of the automatic means for removing the bottles from the machine;

Fig. 9 is a plan view of the same, and

Fig. 10 is an end elevation of the automatic means for removing the bottles from the machine.

Referring to Figs. 1 to 3 of the drawings 1 indicates a frame forming a support for the various parts of the device. A bottle conveyer 2 is mounted on the frame and runs on tracks 3 attached thereto. This conveyer is an extension of the conveyer which carries the bottles through the soaking device as shown in the copending applications, Serial No. 647,005 and No. 678,316, above referred to. It is to be understood, however, that the present structure may be built as a unit which may be fed by hand or otherwise from some other form of washer. The conveyer is intermittently actuated in the directions indicated by the arrow on Fig. 2 by the dogs 4 attached to the reciprocating rods 5 mounted in the guides 6. Bottles 7 are placed in the conveyer as indicated and after being subjected to the soaking operation pass into the present apparatus for further treatment.

A shaft 8 is mounted in suitable bearings on the frame 1 and adapted to be driven through the gear 9 and the worm 11 from the shaft 12 which is in turn driven from any suitable source of power. The oppositely disposed cam wheels 10 are keyed to the shaft 8 and are rotated thereby. The shaft 12 is provided with a bevel pinion 13 meshing with a bevel gear 14 secured to the sleeve 15 which is supported in a bearing 16 and adapted for rotation therein.

A gear 17 is mounted beneath the bevel gear 14 on the sleeve 15 and drives a plurality of similar gears $17^a$, $17^b$, $17^c$ and $17^d$ on either side thereof, each mounted on a sleeve similar to sleeve 15. A squared spindle 18 is slidably mounted in each of the sleeves 16 and carries at one end a brush member 19. The spindles 18 extend upwardly to loosely engage a rod 20 which extends transversely across the top of the machine and is supported at either end by means of links 21 on levers 22 pivoted on the frame at 23. A head 18' is provided at the upper end of the spindles 18 to limit the downward movement thereof.

The levers 22 are provided with cam rollers 23' which run in the cam tracks 24 of the cam wheels 10 fast to the shaft 8. The ends of the levers 22 are connected through the links 25 with a cross head 26 slidably mounted in the opposite sides of the frame 1. The cross head 26 carries a plurality of pairs of slidably mounted rods 27 having at one end clamping members 28 and at the other suitable heads 29 to limit the downward movement of the clamping rods.

In the side of the cam wheels 10 opposite the cam tracks 24 are cam tracks 29' in which run cam rollers 30 mounted on the connecting rods 31 which are provided at one end with the slots 32 slidably engaging the ends 33 of the shaft 8 and at the other with yokes 34 each engaging a member 35 which is adapted to slide on a track 36 on the lever 37 pivoted to the frame 1 at 38. A hand wheel 39 is mounted on the shaft 40 extending transversely of the machine and provided with worms 41 engaging worm gears 42 to turn the screws 43, whereby the members 34 are moved to and from the pivots 38. By this means we are enabled to adjust to a nicety the throw of the levers 37 due to the movement of the connecting rods 31.

The levers 37 are connected by means of the links 44 with a member 45 which is slidably mounted to reciprocate vertically on standards 46 which pass through the flanges 48 of the frame 1, and are rigidly held at the floor. The member 45 is provided with a pressure box 57, which is intermittently connected through the flexible pipe 58 with a source of water under pressure. From the pressure box 57 a plurality of pairs of hollow spindles 59 project upwardly, the spindles being provided with suitable bearings 60 within the pressure box. The spindles 59 are preferably square in cross section and pass at their upper ends through a plurality of sleeves 61 rotatably mounted in bearings in the casing 62 connected to the frame 1 beneath the conveyer 2. The sleeves are provided with intermeshing gears 63 which are adapted to be driven by a gear 64 mounted in the casing 62 and connected by means of the bevel gears 65 and 66 to any suitable source of power, such as the motor 66', whereby the spindles 59 are constantly rotated in their bearings.

The spindles 59 terminate in tapered nipples 67 which are adapted, when the spindles are raised, to enter the sockets 68 in members 69 and form therewith a driving connection. The members 69 are mounted in suitable bearings in the member 70 which extends transversely of the machine and is slidably mounted on standards 46 by means of guides 47. Attached to the members 69 are a plurality of hollow spindles 73 which extend into the ferrules 74 and are provided at their upper ends with brushes 75. The ferrules 74 are mounted in the sockets 74' supported on the frame 1 and are normally pressed upward by the springs 75' disposed between the ferrules and their sockets. The ferrules are connected at their lower extremities by means of lugs 72' to the saddle 72 extending transversely of the frame and fixed to the rods 71 which loosely engage the member 70, forming a sliding connection therewith. The rods 71 hold the ferrules 74 in their lowermost positions against the action of the springs 75' when the member 70 is lowered.

Mounted on the member 45 and slidably engaging the member 70 are rods 51 carrying the springs 50 which are adapted to engage and lift the member 70 after the member 45 has completed a portion of its upward travel and as the nipples 67 engage the sockets 68 to form a driving connection therewith. The springs 50 prevent shocks as the member 70 is lifted. The springs 53 are mounted on the frame 1 to engage the member 70 and prevent shock as the member 70 descends.

Supported on the frame 1 adjacent the guides 74 is the pressure box 76 adapted to be intermittently supplied from a source of water under pressure through the pipe 77 and provided with a plurality of pairs of openings 78 spaced apart a distance equal to the distance between adjacent bottle holders on the conveyer 2, constituting the means for finally rinsing the insides of the bottles.

Suitable troughs 79 are provided at either side of the brushing and rising means to carry off the water which drains from the bottles during these operations.

The operation of this portion of the machine will, it is thought, be readily understood from the foregoing description. The conveyer 2 is intermittently moved forward a distance equal to that between the successive bottle holders. The shaft 12 revolves continuously and through the medium of the gear train rotates the spindles 18 carrying brush members 19 which are intended to clean the bottoms of the bottles. As the shaft 12 rotates the shaft 8 and the cams 10, the rollers 23 pass into the flattened portion of the cam track 24 and allow the rod 20 and the cross head 26 to descend, lowering the brush members 19 and clamping members 28, respectively, into engagement with the bottles. It is to be noted that both the brushes and the clamping members are provided with lost motion connections with the rod 20 and the cross head 26, respectively, in order that bottles of different lengths may be accommodated and breakage prevented.

Simultaneously with the lowering of the brush members 19 and the clamping members 28, the member 45 is raised through the medium of the cam wheel 10, connecting rod 31 and lever 37, thus raising the pressure box 57 and its spindles 59 which are constantly revolved by the gears 61. The nipples 67 engage the sockets 68 and the springs 50 raise the member 70 carrying the spindles 73 with their brushes 75. The spindles 73 and brushes 75 are revolved at a high rate of speed through the driving connections with spindles 59. As the member 70 is raised the springs 75' which are normally held under tension by the rods 71 are allowed to force the ferrules 74 upward simultaneously with the movement of the brushes 75 until the ferrules engage the necks of the bottles. The brushes are thereby inclosed at all times within the ferrules until they enter the bottles preventing undue wear of the brushes as they are reciprocated to and from the bottles. The brushes 75 enter the bottles which are positioned over them by the movement of conveyer 2 and held from rotary movement by the clamping members 28. Water under pressure is simultaneously allowed to enter the pressure boxes 57 and 76, that in box 57 escaping into the bottles through the spindles 59 and 73 and the brushes 75 and that in box 76 squirting upward through the openings 78 into the mouths of the bottles. The water which drains from the bottles escapes to the troughs 79 which carry it from the machine. Before the next movement of the conveyer which carries one row of bottles from the machine the cam wheel 10 causes the brush members 19, the clamping members 28 and the spindles 73 to be withdrawn from the bottles and the conveyer is free to move one step forward before the next operation. It will be seen that in the operation described each bottle is brushed once on the bottom, twice internally and is rinsed twice. The bottles are then allowed to drain into the trough 79 before leaving this portion of the machine.

The conveyer then carries the bottles to the portion of our device adapted to brush the outside of the bottles to remove any adhering dirt therefrom.

Referring to Figs. 4 to 7, extensions 5' of the reciprocating rods 5, which have been previously described as actuating the conveyer 2 through dogs 4, are connected through levers 80 pivoted on opposite sides of the frame and connecting rods 81 to levers 82 pivoted on extensions of the shaft 83 mounted in the frame. The levers 82 carry pawls 84 which are held by springs 85 in engagement with ratchets 86 keyed to the shaft 83. Gears 87 are fixed to the shaft 83 and mesh with pinions 88 keyed to the shaft 89 upon which are mounted a plurality of sprockets 90 for rotation therewith. An endless chain conveyer 91 adapted to be driven in the direction of the arrow in Fig. 4 by the sprockets 90 and carrying a plurality of cup-shaped members 92 is disposed about this portion of the machine, a plurality of tracks 93 being provided upon which turn the anti-friction rollers 94' with which the conveyer is provided. The function of the cup-shaped members 92 will presently appear.

A shaft 94 is mounted in the frame and driven through suitable connections from the motor 66' (see Fig. 2). The shaft 94 is adapted to drive the shaft 97 mounted in the frame 1 and extending transversely thereof through the bevel gear 95 and bevel pinion 96 which is fast to the shaft 97. Mounted on the shaft 97 is a gear 98 which meshes with and drives the gear 99 fixed to the shaft 100. A sprocket 101 is fixed to the shaft 100. A shaft 102 is similarly mounted in the frame 1 and is provided with a sprocket 103 loosely mounted thereon and adapted to be intermittently connected to the shaft through the medium of a clutch 103' as will presently be described. A chain 104 connects the sprockets 101 and 103 to drive the latter from the former. A plurality of sprockets 104' are fixed to the shaft 102 and serve to drive the chain conveyer or moving support 105, which is provided with blocks 106 of wood or other suitable material, in the direction indicated by the arrow in Fig. 5 along the tracks 107.

Fixed to the rock shaft 129, which is mounted in opposite sides of the frame in friction bearings, are the cam arms 130 which are disposed in the path of the cam plates 131 mounted on the cup-shaped members 92 of the conveyer 91. An arm 132, also fixed to the rock shaft 129, is connected by means of the link 133 to a latch member 134 pivoted at 135 on the frame 1. The latch member 134 is provided with a cam-shaped nose 136 which normally engages a spring pin 137 on the clutch member 103' and forces the pin outwardly to withdraw it from one of the slots 138 in the sprocket 103, thereby freeing the sprocket 103 from the shaft 102. When the pin 137 is released it is forced into one of the notches 138 and the shaft 102 is driven from the constantly driven sprocket 103. Arms 129' are fixed to the rock shaft 129 and are connected by rods 130' to arms 131' on the connecting rods 81. This connection serves to turn the rock shaft 129 in a direction opposite the movement imparted by the cam plate 131, when the connecting rod 81 moves rearwardly. The rock shaft 129 also carries a plurality of arms 139 each provided with a spring controlled roller 140 disposed in the path of the bottles moving on the conveyer 105 and adapted to hold the bottles in proper alinement between the partitions 141 (see Fig. 6).

A sprocket 108, mounted on the shaft 100, is connected by means of a chain 109 with a sprocket 110 on the shaft 111 mounted in the swinging arms 112 pivoted on the shaft 100 on opposite sides of the machine. Fixed to the shaft 111 are the revolving brushes 112' and a second series of revolving brushes 113 are similarly mounted on the swinging arms 112 and are driven from the shaft 111 by means of a chain 114 connecting the sprockets 115 and 116.

The swinging arms 112 and the revolving brushes 112' and 113 are intermittently moved toward and from the path of the bottles on the conveyers 91 by means of cam plates 147 pivoted on opposite sides of the frame 1 at 148 and having a rolling connection with the swinging arms 112 at 149. The cam plates 147 are provided with cam tracks 150 which are engaged by rollers 151 on the connecting rods 81 so that as the connecting rod approaches its rearmost position preparatory to a new forward stroke the swinging arms 112 and the brushes are lifted from the path of the bottles. A perforated pipe 152 is mounted on the frame 1 above the brushes 112' and 113 and is supplied with water through a pipe 153. The pipe 152 is adapted to spray water on the bottles as they are brushed.

On the shaft 97 are a plurality of bevel pinions 96 and each engages and drives a bevel gear 117 on a shaft 118 mounted in suitable brackets on the frame 1. Each of the shafts 118 carries a roller 119 of wood or other suitable material the function of which will hereafter appear.

The end of the previously described conveyer 2 passes over sprockets 120 mounted on the shaft 121 at either end of the machine. Mounted on the shaft 121 are a plurality of plunger wheels 122 each disposed beneath one of the rows of bottle holders on the conveyer 2. Each plunger wheel 122 is provided with a plurality of plungers 123 of rubber or other suitable material adapted to engage the neck of a bottle and force it out of its holder. This device prevents the bottles from sticking in the holders causing damage to the bottles and to the machine.

Mounted on the rod 124 secured to the frame 1 transversely of the device are a plurality of partition plates 125 disposed between the adjacent holders on the conveyer 2 to prevent sidewise movement of the bottles as they leave the conveyer 2. A pair of arms 126 on the frame 1 supports a plurality of swinging bars 127 which are normally pressed forward by the springs 128. These bars engage the bottoms of the bottles on the conveyer 2 and prevent them from falling onto the conveyer 105 until the preceding bottles have been removed.

Mounted on a rock shaft 142 extending transversely of the frame are a plurality of levers 143 each having at one end a roller 144 adapted to ride over a cam plate 131 on the cup-shaped members 92 and at the other end a slidably mounted gate member 145 pivotally mounted thereon and normally held up by a spring 146 but depressible by the lever 143 when the roller 144 engages the cam plate 131.

Adjacent the discharge end a rock shaft 147' is mounted transversely of the machine and is provided with a lever 148'. A tension spring 149' connects the end of the lever 148' with a bracket 150' on the frame 1. Mounted on the rock shaft 147' are a plurality of guides 151' normally held in the path of the bottles on the conveyer 91 and adapted to guide the bottles onto the automatic means for removing them from the machine, which will presently be described. Cam levers 152' are fixed to the rock shaft 147' in the path of the cam plates 131 on members 92 of the conveyer 91 and are adapted to be lifted by the cam plates to rotate the rock shaft 148' and thereby move the guides 151' out of the path of the members 92 after the bottles have been delivered.

The operation of the device will be described with respect to a single bottle although it is to be understood that the machine is adapted to handle a plurality of rows of bottles. The bottle on the conveyer 2 is carried from the bottom brushing portion of the machine, as previously described, and as the conveyer 2 passes over the sprockets 120 the bottle is forced outwardly by a plunger 123 to loosen it from its holder. The bar 127 prevents the bottle from falling. Upon further movement of the conveyer 2 the bottle slides onto the conveyer 105 between the partition plates 125 and the partitions 141 and into the path of a cup-shaped member 92 on conveyer 91, intermittently actuated through its connection with the reciprocating rod 5. The cam plate 131 on the preceding cup-shaped member 92 in passing the cam arm 130 turns the rock shaft and raises the latch 134 through the medium of the link 133, thus allowing the spring pin 137 on the clutch 103' to enter one of the slots 138 in the sprocket 103. The sprocket 103 being constantly driven through its connections with the motor 66' rotates the sprockets 104' fixed to the shaft 102, thus driving the conveyer 105 until the latch 134 is forced into the path of the pin 137 by the rotation of shaft 129 through rod 130' upon the rearward movement of the connecting rod 81. As soon as the pin 137 engages the cam-shaped nose 136 of the latch 134 the pin is forced out of engagement with its slot 138 and the conveyer 105 is no longer driven by the sprockets 103. The bottle is carried by the conveyer 105 to a position beneath the roller 140 where it is stopped by the gate 145 actuated through the lever 143 by the engagement of the cam plate 131 with the roller 144. As the cam plate 131 passes the roller the gate 145 is raised by the spring 146 but since the conveyer 105 is no longer in motion the bottle is held stationary by the roller 140 until it is picked up by a cup-shaped member 92 on the conveyer 97.

The bottle is carried by the conveyer 91 up the inclined portion of the frame and over the rollers 119 (see Fig. 7) which are constantly rotated through their connection with the motor 66'. Simultaneously the forward movement of the connecting rod 81 allows the swinging arm and the revolving brushes 112' and 113 to move into engagement with the bottle. The bottle is rotated about its longitudinal axis by the rollers 119 and is sprayed with water from the pipe 152 while it is thoroughly brushed by the brushes 112' and 113, thus removing all dirt which may not have been removed in the previous operation. The bottle is then carried by the conveyer 91 over the discharge end of the machine through the guides 151' which are then lifted by the cam plates 131 to allow the members 92 to pass. The bottle is deposited on the automatic means for removing it from the machine which will now be described.

Mounted at one end of the frame 1 is a pair of brackets 154 supporting the automatic means for removing bottles from the machine. A base plate 155 extends between the brackets. A side plate 156 having a beveled nose 157 and a slotted plate 158 having a lining 159 of fiber or other suitable material are similarly mounted forming a trough. An endless belt 160 extends along the base 155 over the wheels 161 and 162 at either end and beneath the brackets 154. The belt 160 is adapted to be driven from any suitable source of power through the bevel gears 163 and the pulley 164.

Mounted in the brackets 154 is a rock shaft 165 having a plurality of arms 166 fixed thereto each carrying a blade 167 adapted to engage the slots in the plate 158. A lever 168 is fixed to one end of the rock shaft 165 and adapted to be actuated by means of a connecting rod 169 which operatively engages an arm 170 of the connecting rod 81 and is provided with a collar 169'. At its opposite end the rock shaft 165 is provided with a lever 171 connected at one end to the frame 1 by means of a tension spring 172 which normally draws the lever 171 toward the frame 1 and holds the blades 167 in the position indicated in Fig. 5. When, however, the connecting rod 169 is moved forward during the movement of the conveyer 91, the collar 169 will be engaged by the arm 170 as the arm nears the limit of its movement and the connecting rod will actuate the lever 168 to turn the rock shaft 165 and move the blades 167 through the slotted plate 158 to form compartments above the belt 160 to receive the bottles. The blades 167 are provided at their lower edges with a portion 173 extending in a direction opposite to the direction of movement of the belt 160. This portion engages the bottles near their bottoms as the belt moves them against the blades and prevents overturning of the bottles.

The operation of the automatic means for removing bottles from the machine will, it is believed, be apparent without further description. The bottles which have been subjected to the outside brushing operation are carried by the conveyer 91 to the delivery point. During the forward movement of the connecting rod 81 to actuate the conveyer 91 the connecting rod 169 is, through the collar 169', moved forward to force the blades 167 over the belt 160. The bottles are delivered into the compartments formed by the blades and fall in an upright position onto the belt 160 which is constantly moving. As the connecting rod 81 recedes the blades 167 are withdrawn and the belt 160 carries the bottles still in an upright position to a point outside the machine and delivers them preferably upon a suitable conveyer which carries them directly into the filling machine (not shown).

The belt 160 is timed to move all of the bottles delivered at each stroke of the connecting rod 81 out of the machine and the belt is, therefore, then free to receive the next lot of bottles from the machine. The filling machine may be timed to run slightly faster than the washing machine so the bottles are filled as fast as washed and without being handled by workmen.

While we have described a constantly moving belt as a means for removing the bottles and this is the preferred embodiment of our invention it is obvious that an intermittently moving belt may be substituted therefor.

It will be readily understood from the foregoing description and explanation that we have perfected a device which, especially when used in connection with the soaking machine disclosed in the copending applications previously referred to, results in numerous advantages. The bottles are not only cleaned on the inside but the bottoms, which are frequently very dirty, are thoroughly cleaned and all dirt is brushed and removed from the outside of the bottles. By the use of our device the bottles are delivered as clean as if they had never been previously used, insuring against any spoiling of the bottled beer which is a frequent result of uncleaned bottles.

It is to be understood that the device described and claimed in the present application is adapted to be applied to various forms of bottle washing machines adapted to soak or otherwise treat the bottles and it is to be further understood that various changes may be made in the form, proportions and arrangement of the parts without departing from the spirit and scope of the invention or sacrificing any of its material advantages, the form herein described being merely a preferred embodiment thereof.

We claim:

1. In a bottle washing machine, the combination of a frame, a conveyer mounted on said frame for carrying bottles through the machine, reciprocating means for actuating said conveyer, a pair of swinging arms mounted on said frame, a brush rotatably mounted on said arms and extending transversely of the frame, means for rotating said brush, cam plates pivotally mounted on said frame having means for engaging said arms, and means moving with said reciprocating means to engage and rock said cam plates, thereby automatically lifting said brush from engagement with the bottles on said conveyer before the latter advances and permitting said brush to again engage the bottles when the conveyer is at rest.

2. In a bottle washing machine, the combination of a frame and an endless chain conveyer mounted on said frame, means for intermittently advancing said conveyer, a plurality of spindles rotatably mounted between the opposite sides of said conveyer and carrying brushes adapted to be inserted in the bottles as they are positioned thereover by said conveyer, a plurality of constantly rotating spindles beneath the lower side of said conveyer, and means for intermittently raising said constantly rotating spindles to engage with and rotate said first-mentioned spindles.

3. In a bottle washing machine, the combination of a frame, a conveyer mounted on said frame, a plurality of rotatable spindles carrying brushes and adapted to be inserted in the bottles as they are positioned thereover by said conveyer, ferrules surrounding each of said brushes, resilient means tending to force said ferrules into engagement with the necks of the bottles, and means for tensioning said resilient means and thereby holding said ferrules out of engagement with the necks of the bottles when the spindles are withdrawn therefrom.

4. In a bottle washing machine, the combination of a frame, a conveyer mounted on said frame, a member extending transversely of the machine, a plurality of spindles rotatably supported by said member and carrying brushes adapted to be inserted in the bottles as they are positioned thereover by said conveyer, a ferrule surrounding each of said brushes, a spring adapted to force said ferrules into engagement with the necks of the bottles, and means connecting said ferrules to said member for tensioning said springs and thereby holding said ferrules out of engagement with the necks of the bottles when the spindles are withdrawn therefrom.

5. In a bottle washing machine, the combination of a frame, an endless chain conveyer mounted on said frame, a plurality of hollow rotatable spindles carrying brushes adapted to be inserted in the bottles when they are positioned thereover by said conveyer, continuously rotated means disposed beneath the lower section of the conveyer and adapted to be raised into contact with said spindles whereby the spindles are rotated, and means for supplying a liquid under pressure to said spindles.

6. In a bottle washing machine, the combination of an intermittently actuated conveyer provided with bottle holders, a spindle disposed above said conveyer and having a brush at one end thereof, means for continuously rotating said spindle, and means for intermittently lowering said spindle and brush until the latter contacts with the bottom of a bottle positioned below said brush by said conveyer, said spindle being loosely connected to said lowering means to compensate for varying lengths of the bottles.

7. In a bottle washing machine, the combination of a frame, one end of said frame being inclined, a conveyer disposed about said frame and having cup-shaped members adapted to engage the necks of the bottles, means for delivering bottles to said conveyer, means for automatically spacing the bottles thereover including a moving support and stop means coöperating therewith, and means disposed above the inclined portion of the frame for scrubbing the bottles.

ROCKWELL L. GALLUP.
WALTER G. WACHS.

Witnesses:
WM. O. BELT,
ERNEST H. MERCHANT.